United States Patent [19]

Jackson et al.

[11] Patent Number: 4,947,255
[45] Date of Patent: Aug. 7, 1990

[54] VIDEO LUMINANCE SELF KEYER

[75] Inventors: Richard A. Jackson, Nevada City; Richard S. Bannister, Grass Valley, both of Calif.

[73] Assignee: The Grass Valley Group, Inc., Grass Valley, Calif.

[21] Appl. No.: 245,472

[22] Filed: Sep. 19, 1988

[51] Int. Cl.$^5$ ............................................. H04N 5/272
[52] U.S. Cl. ................................................. 358/183
[58] Field of Search ............... 358/183, 22, 21 R, 182, 358/172

[56] References Cited

U.S. PATENT DOCUMENTS

| | | | |
|---|---|---|---|
| 4,386,363 | 5/1983 | Morrison | 358/22 |
| 4,488,169 | 12/1984 | Yamamoto | 358/183 |
| 4,506,289 | 3/1985 | Shirakami | 358/183 |
| 4,758,892 | 7/1988 | Bloomfield | 358/183 |

*Primary Examiner*—Tommy P. Chin
*Attorney, Agent, or Firm*—Francis I. Gray

[57] ABSTRACT

An improved luminance video self keyer extracts a key signal from an unshaped input video signal as a function of a low and a high clip level. The input video signal is subsequently "shaped" as a function of the key signal and the low clip level. The result is a shaped video signal and an associated key signal that are combined with a secondary video signal without resorting to double multiplication of the input video signal by its associated key signal to produce a desired combination of the two video signals.

8 Claims, 2 Drawing Sheets

VIDEO LUMINANCE SELF KEYER

BACKGROUND OF THE INVENTION

The present invention relates to video processing, and more particularly to an improved video luminance self keyer that extracts a key signal from an unshaped input video using a clip level that establishes one end of a transition range of the key signal, and uses the key signal and clip level to "shape" the input video in order to avoid double multiplication of the input video by the key signal.

Keying is a common and often used operation in video production. A key consists of three elements: a background video signal, a foreground video signal and a key signal. These three signals typically are input to a mixer, with the key signal being the control input, so that the output of the mixer is foreground video when the key signal equals one, background video when the key signal equals zero, and a proportional mix of the foreground and background videos when the key lies between zero and one. The type of key produced by the operation depends upon the way the key signal is derived. If the key signal is a function of the luminance level of some video signal, it is called a luminance key. If the key signal is a function of the chrominance level of some video signal, it is called a chroma key. If the video used to derive the key is the foreground video used in the mixer, it is called a self key. If the video used to derive the key is unrelated to either the foreground or background videos, it is called an external key.

A circuit typically used to extract a key signal from the luminance portion of a video signal is called a clip and gain circuit. In this circuit the incoming video signal is compared against a threshold level, called the clip level. If the video level is far below the clip level, the key output is typically zero. Likewise if the video level is far above the clip level, the key output is typically one. When the video level is equal to the clip level, the key output is typically one-half. For a region of video levels slightly above and below the clip level the key output varies between zero and one, providing a soft transition from one limit to the other. The width of this transition is determined by the gain of the circuit: high gains cause a small transition region, meaning an abrupt switch at the output of the mixer between the foreground and background videos; and low gains result in broader transition regions, causing the mixer output to make more gradual transitions between the two videos.

The clip and gain levels of the circuit typically are set by an operator for the most pleasing effect, and may be fixed for the duration of a video effect, may vary on a field-by-field basis as part of an in-betweening keyframe sequence, and/or may vary dynamically within a video field as determined by a modulating mask signal. When the clip and gain circuit is used in a self key configuration, a typical problem is that of double multiplication. For video levels within the transition region the key output is a direct function of the input level. This key is then used to mix between the background and the same, i.e., foreground video, input, causing a change in the "shape" of the video. This occurs because the mixer internally multiplies the foreground video by the key signal, where the key signal already is a function of the foreground video. The visual effect of this double multiplication varies depending upon the video content, but typically results in a darkening of the video in the transition region.

What is desired is an improved luminance video self keyer that eliminates the effects of double multiplication.

SUMMARY OF THE INVENTION

Accordingly the present invention provides an improved luminance video self keyer that requires only a single multiplication of a foreground video by a key signal. Using shaped video techniques the foreground video is assumed to have been multiplied by its own key signal, so a mixer merely multiplies the background video by the complement of the key signal and adds the result to the foreground video. The foreground video is processed by a transfer function described by the input levels at which a transition region of the key signal begins and ends. The levels of the input video below a low clip point are made zero and levels above a high clip point are made one, while levels that fall within the transition region are scaled to begin at zero, the low clip level, and end at the high clip level. This transformation from unshaped to shaped foreground video is achieved by subtracting from the foreground video a signal formed by multiplying the low clip level by the complement of the key signal. The resultant shaped foreground video is combined with the background video to produce the desired mixed output.

The objects, advantages and other novel features of the present invention are apparent from the following detailed description when read in conjunction with the appended claims and attached drawing.

DESCRIPTION OF THE PREFERRED EMBODIMENT

Figure 1:
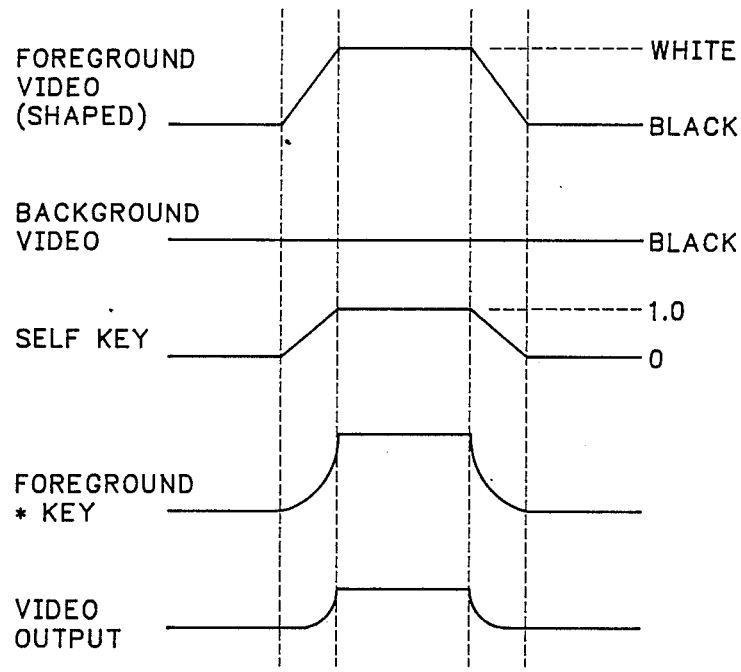
FIG. 1 is a waveform diagram illustrating the effect of double multiplication in the prior art.
Figure 2:
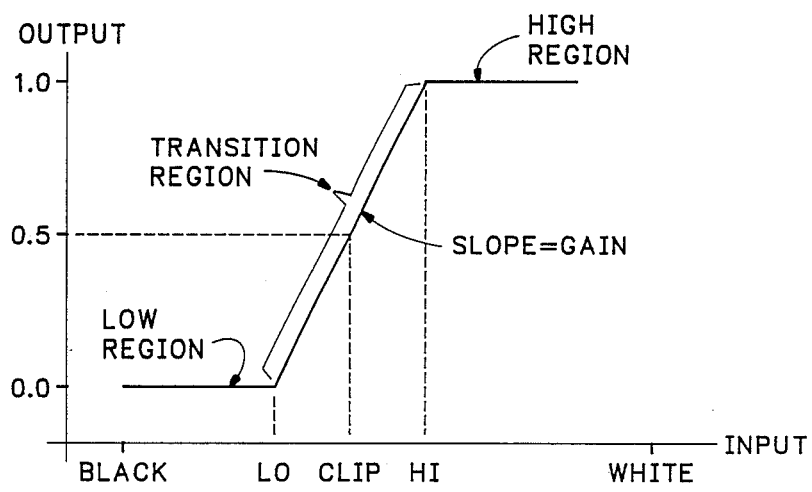
FIG. 2 is a graph of a key extractor transfer function.

Referring now to FIG. 1 a foreground video is shown having a transition from a black level to a white level, and back again to a black level. A black background video is to be mixed with the foreground video. A self key is extracted from the foreground video via a conventional clip and gain circuit having a clip level at fifty percent and a unity gain. When the foreground video is multiplied by the self key in a conventional mixer, the resulting multiplicand and video output have a nonlinear transition between the two videos, resulting in the transition region between the videos being darker than in the ideal linear transition. The transfer function for a key extractor is illustrated in FIG. 2 where the key signal has three regions: a low region where the key signal is zero, a high region where the key signal is one, and a transition region where the key signal varies linearly from zero to one. In actual operation this transfer function has rounded ends at the extremes of the transition region to provide a smooth transition between the high and low regions with the transition region, but for the purposes of the present description and a clear understanding of the present invention, the transfer function of FIG. 2 is assumed. The clip level is set by an operator and determines the one-half point of the key signal. The gain also is set by the operator and determines the slope of the transition region. Gain is defined by the change in output, i.e., one for a key signal, divided by the change in input, i.e., the transition level range of the input signal. The adjustment of the clip and gain levels by an operator is interactive, i.e., both controls affect the positions of all three regions of the key signal.

The transfer function can alternately be described in terms of the input levels at which the transition region begins and ends, identified as a low clip level and a high clip level. The low clip level corresponds to the highest input level for which the key output is zero, and the high clip level corresponds to the lowest input level for which the key output is one. If the operator changes one of the clip levels, the relative positions of only two of the regions changes, not all three. This reduces the interdependency of the controls. The transfer function has not changed, but the method of specifying the relative positions of the three regions of the key signal has been altered. Since a wide transition region is aesthetically more pleasing, the operator sets the low clip level as low as possible without seeing undesired parts of the foreground video, and likewise sets the high clip level as high as possible without having the desired opaque portions of the foreground video blending with the background video.

Figure 3:
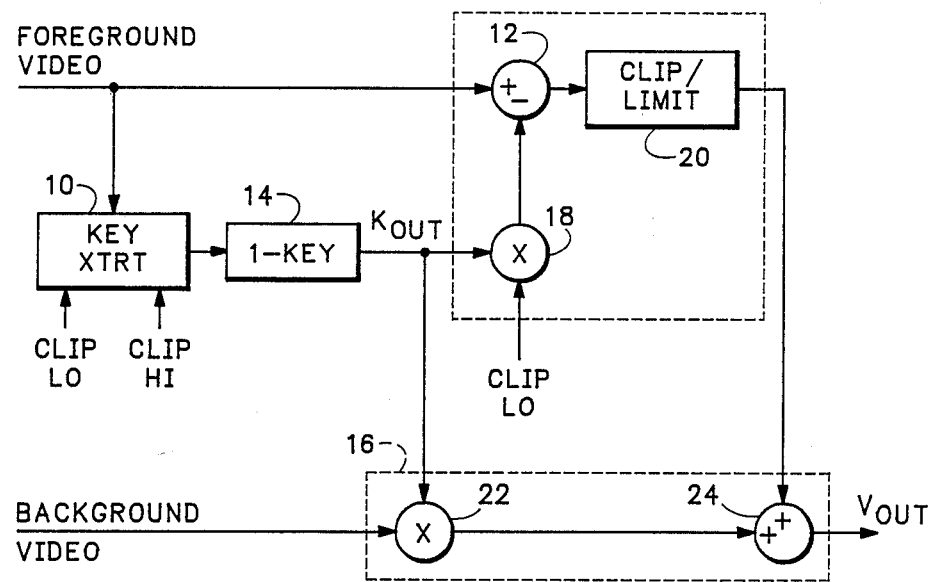
FIG. 3 is a block diagram view of an improved luminance video self keyer according to the present invention.

An unshaped foreground video signal from which a key signal is to be extracted is input to a key extractor 10 and to a subtracter 12 as shown in FIG. 3. The key extractor 10 generates a key signal from the foreground video based upon the high and low clip points established by an operator. The key signal is input to a complementer circuit 14 to produce a signal (1-key) that also is in the range zero to one. The complemented key signal is input to a shaped mixer 16 and a multiplier 18. In the multiplier 18 the complemented key signal is multiplied by the low clip level to produce a shape signal that is input to the other input of the subtracter 12. The output of the subtracter 12 is a "shaped" foreground video signal that is input to a clip/limit circuit 20 and then to the shaped mixer 16. When the foreground video signal has levels below the low clip level, the subtracter 12 output is zero or negative, the negative levels being clipped by the clip/limit circuit 20. When the foreground video signal has levels above the low clip level within the transition region, the subtracted amount is between the clip low level and zero resulting in scaling the slope of the shaped output video in this region.

A background video signal also is input to the shaped mixer 16. Within the shaped mixer 16 is a multiplier 22 to which the background video signal and the complemented key signal are input. The output of the multiplier 22 is input to a combiner 24 which adds the keyed background video signal from the multiplier with the shaped foreground video signal from the clip/limit circuit 20. The output of the combiner 24 is a video output signal that is the combination of the foreground and background videos.

Figure 4:
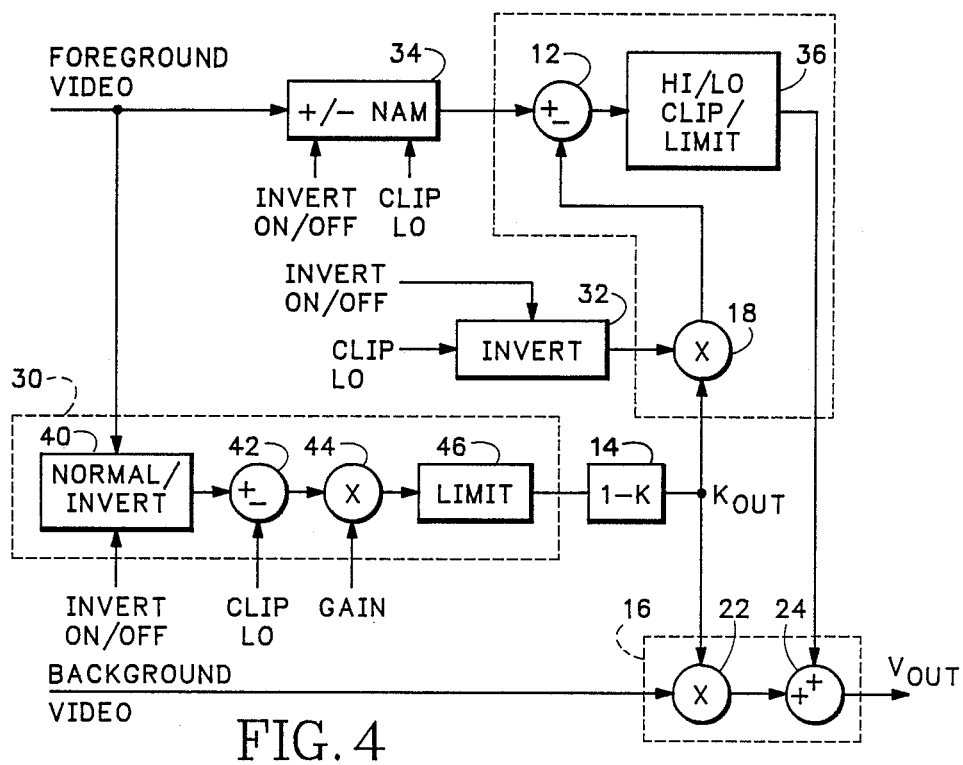
FIG. 4 is a block diagram view of an improved luminance video self keyer with a key invert function according to the present invention.

The improved luminance video self keyer described in FIG. 3 reflects the ordinary key setup where high input levels cause a key output of one and low input levels cause a key output of zero. It is often necessary to do the opposite, however, and extract a key signal that is high for low video levels and low for high video levels. An example of the requirement for key reversal is where a book, having black letters on a white background, is the foreground video and it is desired to key the letters over a background video. This can be done as is shown in FIG. 4 where the input to the keyer is inverted, i.e., blacks made white and vice versa rather than inverting the key signal after extraction. The video is inverted by putting it through a circuit that performs the function:

[(white−input)+black]

where white and black are constant values for peak white and black, respectively. After it has been inverted the video is applied to the key extractor circuit 10 as in FIG. 3. The resultant key is high for the originally dark regions and low for the originally light regions. In FIG. 4 the video inverter is incorporated into a key extractor 30 having as inputs the low clip signal, an invert on/off signal and a gain signal. The gain signal is equivalent to a high clip level, as both establish a slope and high clip level with respect to the already established low clip level. The foreground video signal is input to a normal/inverter circuit 40 that normalizes and inverts the foreground video signal in response to the invert on/off signal. The normalized foreground video signal is input to a subtracter 42 to which also is input the low clip signal so that only the portion of the foreground video signal, inverted or non-inverted, above the low clip level is passed. The output of the subtracter 42 is input to a multiplier 44 to which is input the gain signal to produce the desired transfer function as in FIG. 2. The output of the multiplier is limited by an output limiter 46 to produce the final key signal having values between zero and one that is input to the complementer 14.

Once the key signal has been extracted the process of converting the foreground video signal to a shaped form is slightly different. The foreground video signal has to be re-inverted before being applied to the shaped mixer 16, since the video desired from the foreground video signal is black as in the original, but once the inversion is done the levels that need clipping are those above the inverted low clip level instead of below the low clip level in the non-inverted situation. Therefore the foreground video signal is input to a non-additive mixer (NAM) 34 that inverts the foreground video signal in response to the invert on/off signal by providing an output that is either the low clip level or the foreground video signal above or below the low clip level according to whether the foreground video signal is non-inverted or inverted. The resulting foreground video signal is input to the subtracter 12. The low clip level is in turn also input to an inverter circuit 32 and inverted in response to the invert on/off signal before input to the shape multiplier 18. The output of the shape multiplier 18 is input to the subtracter 12 to produce the shaped foreground video signal that is in turn input to a high/low clip/limit circuit 36. The finally processed foreground video signal is input to the shaped mixer 16 to produce in combination with the background video signal the video output signal having the desired combination of the foreground and background video signals.

Thus the present invention provides an improved luminance video self keyer that extracts a key signal from unshaped video, then "shapes" that video and inputs it to a shaped video mixer for combination with a background video, eliminating double multiplication of the source video by the key signal.

What is claimed is:

1. A keyer comprising:
   means for extracting a key signal from an input video signal as a function of a clip level that defines one extreme of a transition region for the key signal; and
   means for shaping the input video signal using the key signal and the clip level to produce a shaped input video signal.

2. A keyer as recited in claim 1 further comprising means for combining the shaped input video signal with a secondary input video signal that is a function of the key signal to produce an output video signal.

3. A keyer as recited in claim 1 further comprising means for inverting the key signal.

4. A keyer as recited in claim 1 wherein the shaping means comprises:
   means for multiplying the clip level with the key signal to produce a shape signal; and
   means for combining the shape signal with the input video signal to produce the shaped input video signal.

5. A keyer as recited in claim 4 wherein the combining means comprises:
   means for subtracting the shape signal from the input video signal; and
   means for limiting the video signal from the subtracting means to allowable video signal limits to produce the shaped input video signal.

6. A keyer as recited in claim 3 wherein the inverting means comprises:
   means for inverting the input video signal prior to input to the extracting means in response to an invert signal; and
   means for mixing the input video signal with the clip level as a function of the invert signal prior to input to the shaping means.

7. A keyer as recited in claim 6 further comprising means for inverting the clip level prior to input to the shaping means.

8. A keyer as recited in claim 1 wherein the extracting means comprises:
   means for subtracting the clip level from the input video signal;
   means for multiplying the output of the subtracting means by a gain signal that defines the opposite extreme of the transition region with respect to the clip level; and
   means for limiting the output of the multiplying means to a range between zero and one to produce the key signal.

* * * * *